(12) United States Patent
Brune et al.

(10) Patent No.: US 10,931,183 B2
(45) Date of Patent: Feb. 23, 2021

(54) ASYNCHRONOUS MACHINE (71) Applicant: Robert Bosch GmbH, Stuttgart (DE)

(72) Inventors: Andre Brune, Ludwigsburg (DE); Miguel Ruiz De Larramendi, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 16/082,042

(22) PCT Filed: Jan. 9, 2017

(86) PCT No.: PCT/EP2017/050302
§ 371 (c)(1),
(2) Date: Sep. 4, 2018

(87) PCT Pub. No.: WO2017/148601
PCT Pub. Date: Sep. 8, 2017

(65) Prior Publication Data
US 2020/0295638 A1 Sep. 17, 2020

(30) Foreign Application Priority Data
Mar. 4, 2016 (DE) ..................... 10 2016 203 568.1

(51) Int. Cl.
*H02K 17/14* (2006.01)
(52) U.S. Cl.
CPC ......... *H02K 17/14* (2013.01); *H02K 2213/03* (2013.01)
(58) Field of Classification Search
CPC ................................................ H02K 2213/03
(Continued)

(56) References Cited

U.S. PATENT DOCUMENTS 4,409,507 A 10/1983 Godwin
4,831,301 A 5/1989 Neumann
(Continued)

FOREIGN PATENT DOCUMENTS

CN 101640463 A 2/2010
CN 104854775 A 8/2015
(Continued)

OTHER PUBLICATIONS

International Search Report for Application No. PCT/EP2017/050302 dated Mar. 20, 2017 (English Translation, 2 pages).

*Primary Examiner* — Quyen P Leung
*Assistant Examiner* — Minki Chang
(74) *Attorney, Agent, or Firm* — Michael Best & Friedich LLP (57) ABSTRACT

For an asynchronous machine (1), in particular for use in electric vehicles or hybrid vehicles, comprising a rotor (10) and a stator (20) which surrounds the rotor (10), wherein an external stator yoke (21) with a stator yoke height (h21) is formed on the stator (20) and a large number of radially inwardly projecting stator teeth (22) of the same length are formed on the stator yoke (21), wherein a stator slot (23) is respectively formed between adjacent stator teeth (22), wherein an internal rotor yoke (11) is formed on the rotor (10) and a large number of radially outwardly projecting rotor teeth (12) of the same length are formed by the rotor yoke (11), wherein a rotor slot (13) is respectively formed between adjacent rotor teeth (12), wherein the asynchronous machine is of six-phase design, it is proposed that a total number (N1) of stator slots, which denotes the total number of stator slots (23) formed on the stator (20), is seventy-two.

20 Claims, 5 Drawing Sheets (58) Field of Classification Search
USPC .......................................... 310/179–216.137
See application file for complete search history.

(56) References Cited

U.S. PATENT DOCUMENTS

| | | | |
|---|---|---|---|
| 2009/0026868 A1* | 1/2009 | Morgante | H02K 1/2766 |
| | | | 310/156.38 |
| 2010/0026008 A1 | 2/2010 | Sawahata et al. | |
| 2014/0319957 A1 | 10/2014 | Hao et al. | |
| 2015/0311759 A1* | 10/2015 | Heuser | H02K 1/165 |
| | | | 310/195 |
| 2015/0381099 A1 | 12/2015 | Khanin et al. | |

FOREIGN PATENT DOCUMENTS

| | | | | |
|---|---|---|---|---|
| WO | 2014090440 | 6/2014 | | |
| WO | WO-2014090440 A2 * | 6/2014 | ............. | H02K 1/165 |

* cited by examiner

ASYNCHRONOUS MACHINE

BACKGROUND OF THE INVENTION

The invention relates to an asynchronous machine, in particular for use in electric vehicles or hybrid vehicles.

Asynchronous machines are used in many fields of technology, by way of example for electric or hybrid vehicles or for trains. The asynchronous machines may function either as a motor or as a generator.

Asynchronous machines, also referred to as induction machines, comprise as essential components a stator and a rotor. In a similar manner to other electrical machines, the stator is provided with windings by means of which a rotating magnetic field is generated in the stator and said magnetic field rotates at the synchronous rotational speed along the bore hole circumference. The rotor may comprise rods that are connected in a conductive manner to a cage via two short circuit rings. Alternating currents are induced in the conductive cage by means of the rotating magnetic field. Torque is produced as a result of the interaction between the rotating magnetic field of the stator and the magnetic field that is induced in the rotor.

Examples for asynchronous machines that are in part also referred to as induction motors are disclosed by way of example in WO 2014/090440 A2.

Inverters that are also referred to as converters or pulse width modulated inverters and that provide phase currents for the asynchronous machine are used to operate asynchronous machines. The power output of the inverters is limited on the one hand by the maximum reverse voltage of the power semiconductor and on the other hand by the maximum permissible currents of the power semiconductor. As a consequence, the current carrying capacity of the conductor modules is the limiting factor for the transmissible power. It is possible to increase the power output by using multiple modules, which can be realized by way of example by increasing the phase number with respect to the three-phase inverters and motor variants. The basic design of the inverter remains unchanged but the number of semiconductor modules is essentially changed. By way of example, it is theoretically possible to double the power output by increasing a three-phase model to a six-phase model of the asynchronous machine. If the phase number is increased, it is necessary to develop new machine topologies with respect to optimizing the power output, the thermal characteristics, the noise development and the torque ripple of the asynchronous machine.

SUMMARY OF THE INVENTION

In accordance with the invention, an asynchronous machine is proposed in particular for use in electric vehicles or hybrid vehicles. The asynchronous machine comprises a rotor and a stator that surrounds the rotor, wherein an outer-lying stator yoke having a stator yoke thickness is provided on the stator and a multiplicity of radially inward protruding stator teeth that are of identical length is provided on the stator yoke, wherein a stator slot is provided in each case between adjacent stator teeth, wherein an inner-lying rotor yoke is provided on the rotor and a multiplicity of radially outward protruding rotor teeth that are of identical length is provided on the rotor yoke, wherein a rotor slot is provided between adjacent rotor teeth. The asynchronous machine is configured as a six-phase model. In accordance with the invention, a stator slot total number that describes the total number of the stator slots that are to be provided on the stator is seventy two.

In comparison to the prior art, the asynchronous machine of the invention has the advantage that, by virtue of combining a six-phase design of the asynchronous machine with a stator slot total number of seventy two, said asynchronous machine has an advantageously high power output and an advantageously high torque.

In a particularly advantageous exemplary embodiment, the quotient of the stator yoke thickness and a stator hole number is between 3.5 millimeters and 4.5 millimeters, wherein the stator hole number refers to the number of stator slots for each pole and phase of the asynchronous machine. The torque and the power output of the asynchronous machine are advantageously increased by means of these advantageous size ratios.

If the quotient of the stator yoke thickness and a rotor hole number is between 4.0 millimeters and 5.0 millimeters, wherein the rotor hole number refers to the number of rotor slots for each pole and phase of the asynchronous machine, this produces a particularly advantageous geometry by means of which the torque and the power output of the asynchronous machine are further increased.

It is particularly advantageous if the quotient of the stator yoke thickness and the product of the stator hole number and a middle width of the stator tooth is between 0.8 and 1.2, in particular between 0.9 and 1.1. This has the advantage that an asynchronous machine that is configured in such a manner is characterized by a particularly high power output and a particularly high torque.

It has also proven to be particularly advantageous if the quotient of the stator yoke thickness and the product of the rotor hole number and a middle width of the rotor tooth is between 0.8 and 1.2, in particular between 0.9 and 1.1. This advantageously leads to a further increase in the power output of the torque of the asynchronous machine.

In an advantageous manner, the six-phase asynchronous machine comprises two three-phase systems that are electrically phase-offset with respect to one another by thirty degrees. Consequently, the power output and the torque of the asynchronous machine are further increased and the six-phase system may be advantageously combined in a simple manner from two three-phase systems.

In a particularly advantageous exemplary embodiment, a rotor slot total number is fifty two to fifty eight, in particular fifty four. Such a rotor slot total number advantageously reduces parasitic effects such as by way of example noises that are produced as a result of an electromagnetic influence or torque fluctuations that are produced as a result of an electromagnetic influence.

It has proven to be particularly advantageous if the asynchronous machine comprises a pole pair number of three. An asynchronous machine that is configured in this manner is characterized by advantageously minimized parasitic effects such as by way of example noises that are produced as a result of an electromagnetic influence or torque fluctuations that are produced as a result of an electromagnetic influence. Furthermore, the stator may be dimensioned advantageously smaller by means of a pole pair number of three in comparison to an asynchronous machine having a lower pole pair number as a result of the reduced yoke saturation within the stator yoke, as a result of which it is also possible to reduce the total weight of the asynchronous machine and also to achieve an advantageously higher total rotational speed.

In a particularly advantageous exemplary embodiment, the outer diameter of the stator is between two hundred and ten millimeters and two hundred and thirty millimeters, in particular between two hundred and fifteen millimeters and two hundred and twenty five millimeters, preferably in particular between two hundred and eighteen millimeters and two hundred and twenty two millimeters. When the outer diameter of the stator is dimensioned in such a manner, the electrical machine is advantageously optimized with respect to increasing the torque and reducing the parasitic effects such as noises that are produced as a result of an electromagnetic influence or torque fluctuations that are produced as a result of an electromagnetic influence.

BRIEF DESCRIPTION OF THE DRAWINGS

An exemplary embodiment of the invention is illustrated in the drawing and further explained in the description below. In the drawings.

DETAILED DESCRIPTION

The asynchronous machine in accordance with the invention may be used in numerous applications, by way of example said asynchronous machine may be used in electric vehicles or hybrid vehicles, where said asynchronous machine may be operated in the motor mode or generator mode by way of example in conjunction with inverters that are also described as converters or pulse width modulated inverters.

Figure 1:
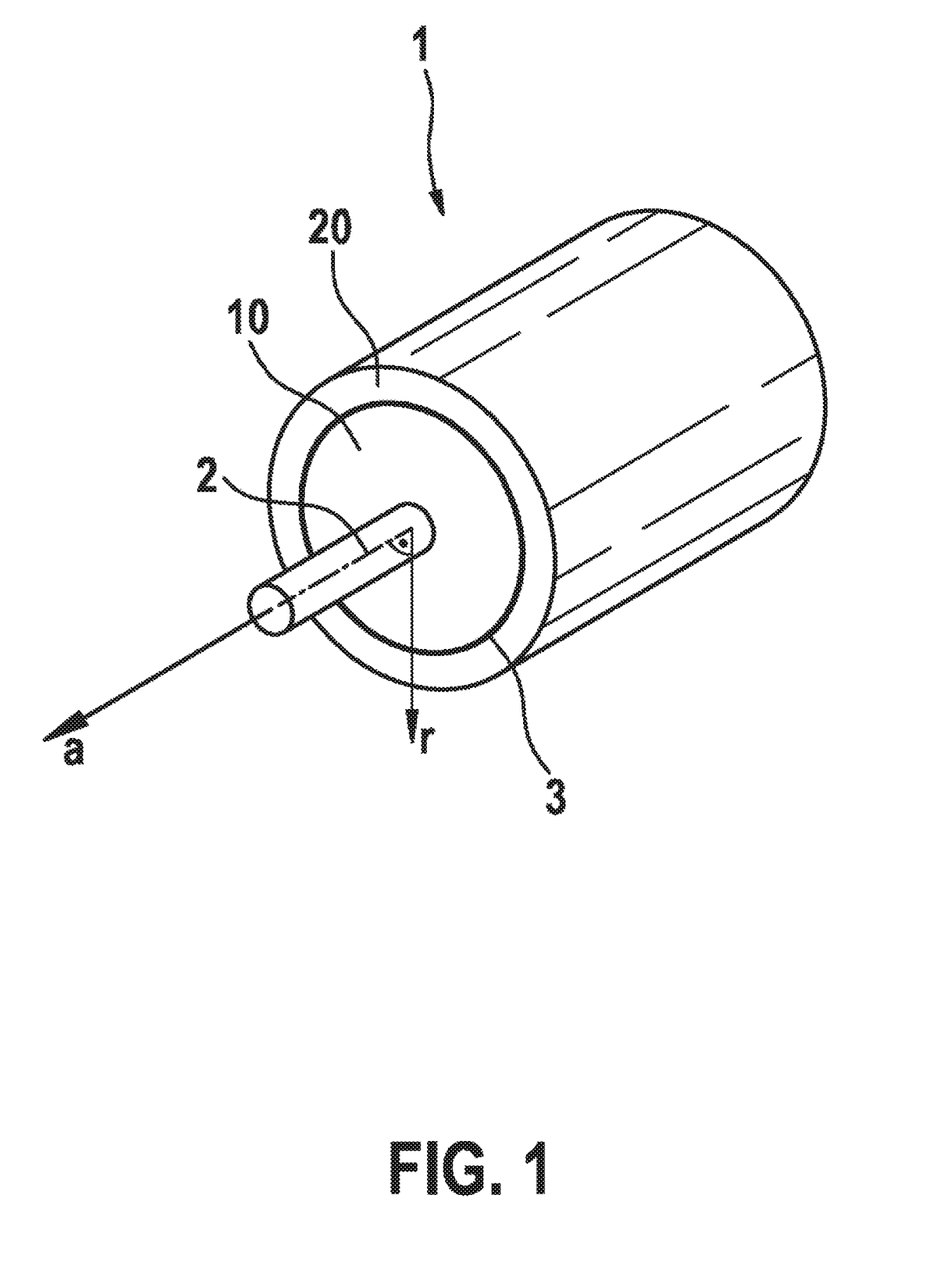
FIG. 1 illustrates a schematic view of an exemplary embodiment of the asynchronous machine in accordance with the invention.

FIG. 1 illustrates a schematic view of a first exemplary embodiment of the asynchronous machine 1 in accordance with the invention. The asynchronous machine 1 comprises a rotor 10 and a stator 20 that surrounds the rotor 10. The rotor 10 is thus arranged within the stator 20 and is able to rotate by way of example about an axis 2. The rotor 10 and the stator 20 have by way of example essentially a cylindrical shape. A gap 3 is provided in this exemplary embodiment between the stator 20 and the rotor 10 with the result that the rotor 10 and the stator 20 do not come into contact with one another as the rotor 10 is rotating. FIG. 1 furthermore illustrates an axial direction a that is illustrated by means of a direction arrow that corresponds to an axis about which the rotor 10 rotates when the asynchronous machine 1 is being operated. Furthermore, FIG. 1 illustrates a radial direction r that extends perpendicular to the axial direction a.

Figure 2:
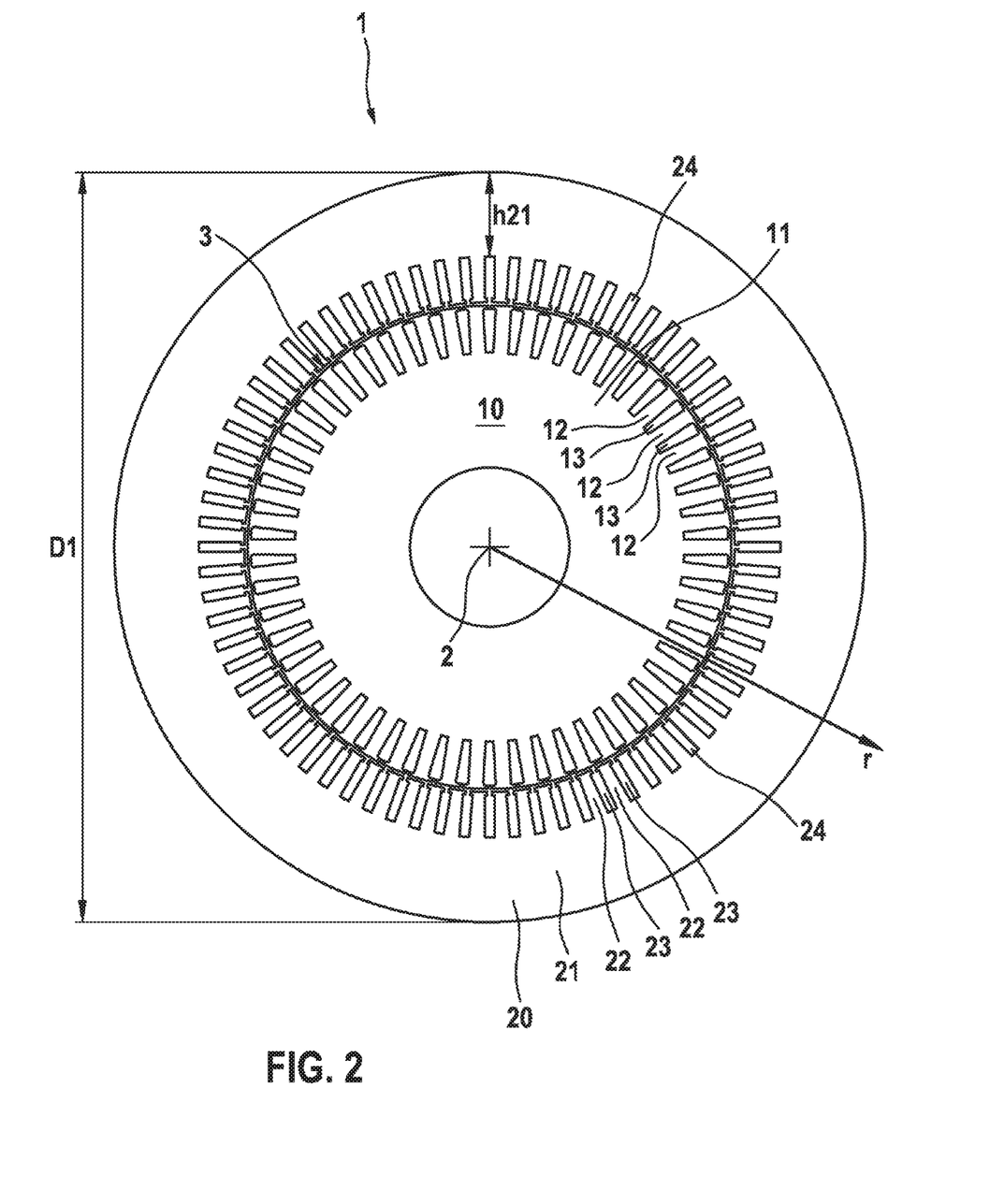
FIG. 2 illustrates a schematic cross-sectional view through the exemplary embodiment of the asynchronous machine in accordance with the invention.
Figure 3:
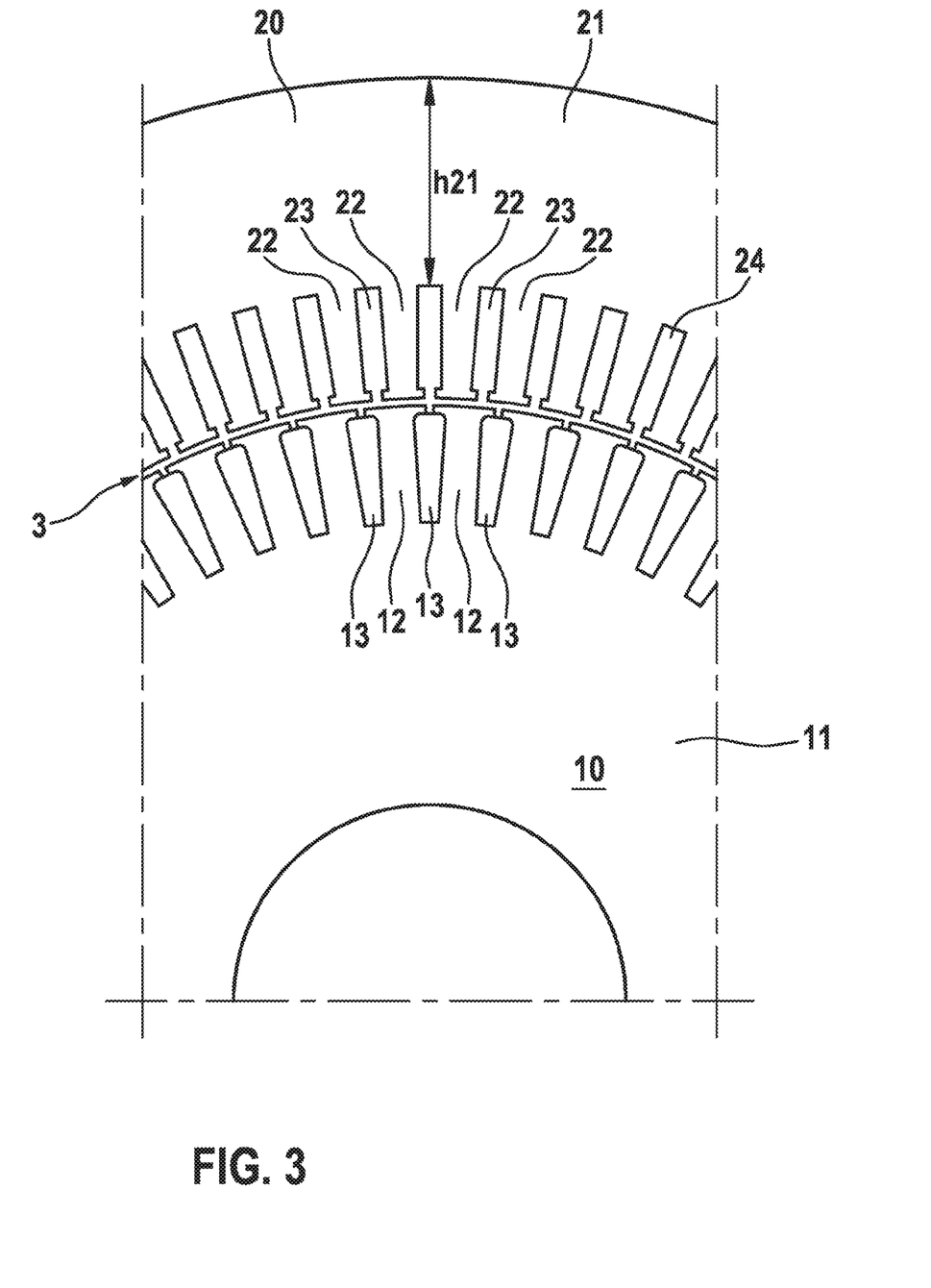
FIG. 3 illustrates an enlarged schematic cross-sectional view through the exemplary embodiment of the asynchronous machine in accordance with the invention.
Figure 4:
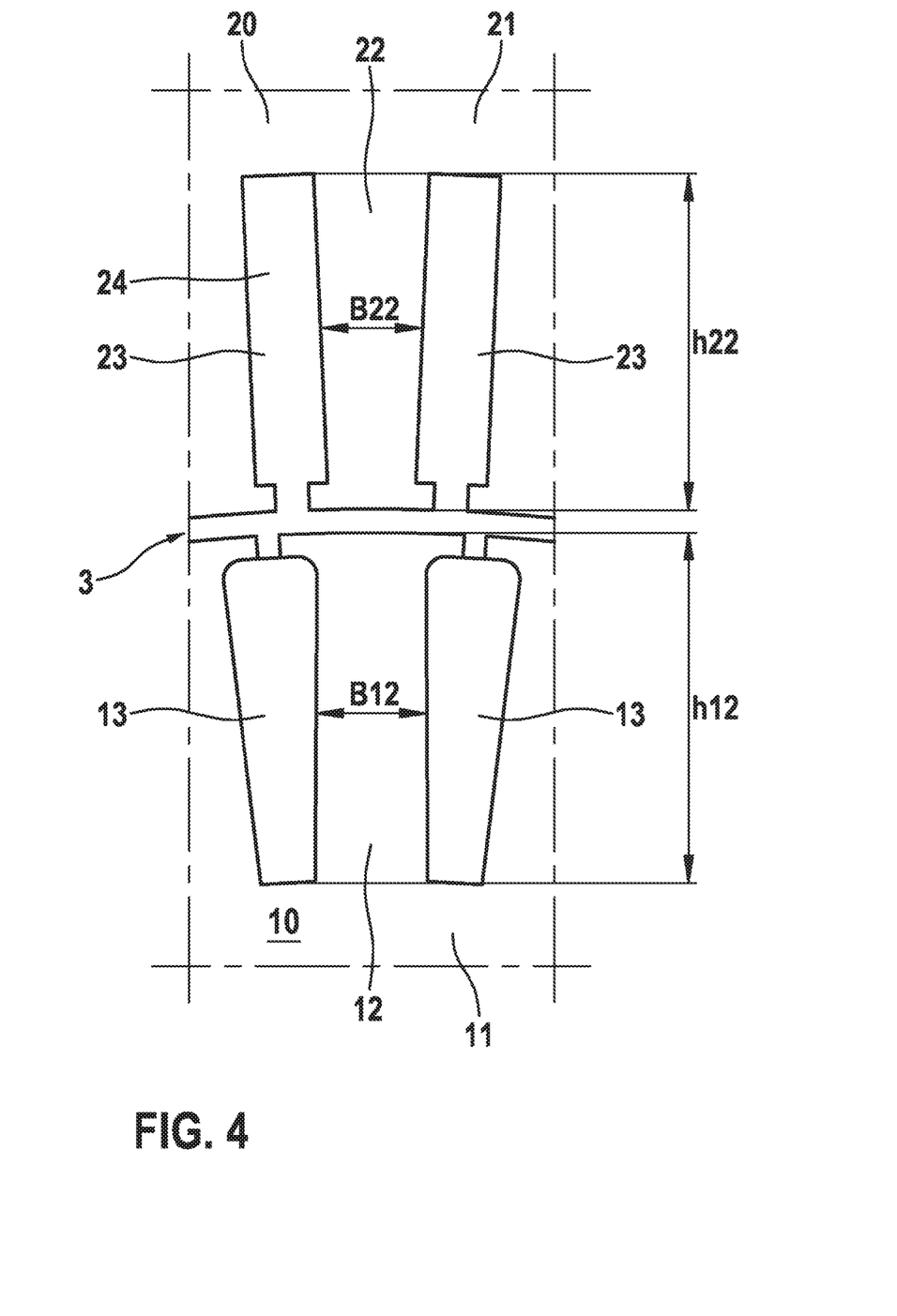
FIG. 4 illustrates a further enlarged schematic cross-sectional view through the exemplary embodiment of the asynchronous machine in accordance with the invention.

FIG. 2 illustrates a schematic cross-section through the exemplary embodiment of the asynchronous machine 1 in a plane that extends perpendicular to the axial direction a of the asynchronous machine 1 through the rotor 10 and the stator 20 of the asynchronous machine 1. FIG. 3 and FIG. 4 illustrate enlarged sections of the cross-section shown in FIG. 2.

The stator 20 comprises a stator yoke 21 that lies outward in the radial direction r. The stator yoke 21 has by way of example a cylindrical shape and is thus illustrated in an annular shape in the cross-section that is illustrated in FIG. 2. The dimension of the stator yoke 21 in the radial direction r is described as the stator yoke thickness h21. Furthermore, the stator 20 comprises a multiplicity of stator teeth 22. The stator teeth 22 are provided on the stator yoke 21 and protrude radially inward from the stator yoke 21. The stator teeth 22 are by way of example all identical in length and in this embodiment also have an identical shape and identical dimensions and are also configured in a symmetrical manner. In each case, a stator slot 23 is provided between adjacent stator teeth 22. In this exemplary embodiment, all the stator slots 23 also have an identical shape and identical dimensions. Each stator tooth 22 has a middle width B22 (FIG. 4). The middle width B22 describes the width of a stator tooth 22 perpendicular to the radial direction r at half the height h22 of the stator tooth 22 (FIG. 4). In this embodiment, by way of example all the stator teeth 22 that are provided on the stator 20 have the identical middle width B22. The stator yoke 21 surrounds the stator teeth 22 and the stator slots 23 in the circumferential direction. The total number of stator slots 23 that are provided on the stator 20 is described by a stator slot total number N1. The stator slot total number N1 of the stator 20 of the asynchronous machine 1 in this exemplary embodiment is seventy two. Accordingly, in this exemplary embodiment, the number of the stator teeth 22 that border the stator slots 23 is also seventy two.

A multiplicity of stator coil elements 24 is arranged about each of the stator teeth 22. The stator coil elements 24 are manufactured by way of example from copper but they may also be manufactured from other materials that have good electrically conductive characteristics, such as by way of example aluminum, and form winding strands. The rotating magnetic field is generated by means of the current that is guided through the winding strands.

The stator 20 may by way of example comprise a multiplicity of sheet metal lamellae that are stacked one above the other in the axial direction a. The sheet metal lamellae may be configured by way of example essentially from a magnetizable, preferable ferromagnetic, material such as for example iron or they may be electrically insulated with respect to one another. The individual lamellae may be stamped by way of example and the stator slots 23 that are provided between adjacent stator teeth 22 may be provided by way of example as stamped out sections in the lamellae. The stator 20 comprises an outer diameter D1. The outer diameter D1 in this exemplary embodiment is two hundred and twenty millimeters.

The asynchronous machine 1 is configured as a six-phase model. In this exemplary embodiment, the asynchronous machine 1 that is configured as a six-phase model comprises two three-phase systems that are electrically phase-offset with respect to one another by thirty degrees.

The asynchronous machine 1 in this exemplary embodiment is configured and controlled in such a manner that it comprises a pole pair number p of 3. The pole pair number p is the number of pairs of magnetic poles of the rotating total magnetic field within the asynchronous machine 1, wherein one pair of magnetic poles comprises a magnetic north pole and a magnetic south pole. In the case of a minimum pole pair number p of one, the asynchronous machine 1 only comprises one pole pair, therefore a magnetic north pole and a magnetic south pole. If the magnetic field that is produced by the stator 20 is reversed, the rotor rotates about one hundred and eighty degrees. In the exemplary embodiment of the asynchronous machine 1 illustrated in this figure, the pole pair number p of the asynchronous machine 1 is three. Accordingly, the rotating magnetic field in this exemplary embodiment comprises three pole pairs, in other words 3 magnetic north poles and 3 magnetic south poles. If the rotating magnetic field that is produced by the stator 20 is reversed, the rotor 10 in this exemplary embodiment thus rotates about sixty degrees. For this purpose, in each case multiple stator coil elements 25 that extend by way of example parallel to the axis 2 and are arranged in the stator slots 23 are energized in the identical direction and/or in the opposing direction. The magnetic field that is generated by the stator coil elements 24 is mainly contained in the stator yoke 21 and the stator teeth 22 and subsequently transmitted from the stator 20 to the rotor 10 in particular to the rotor teeth 12 and the rotor yoke 11.

Figure 5:
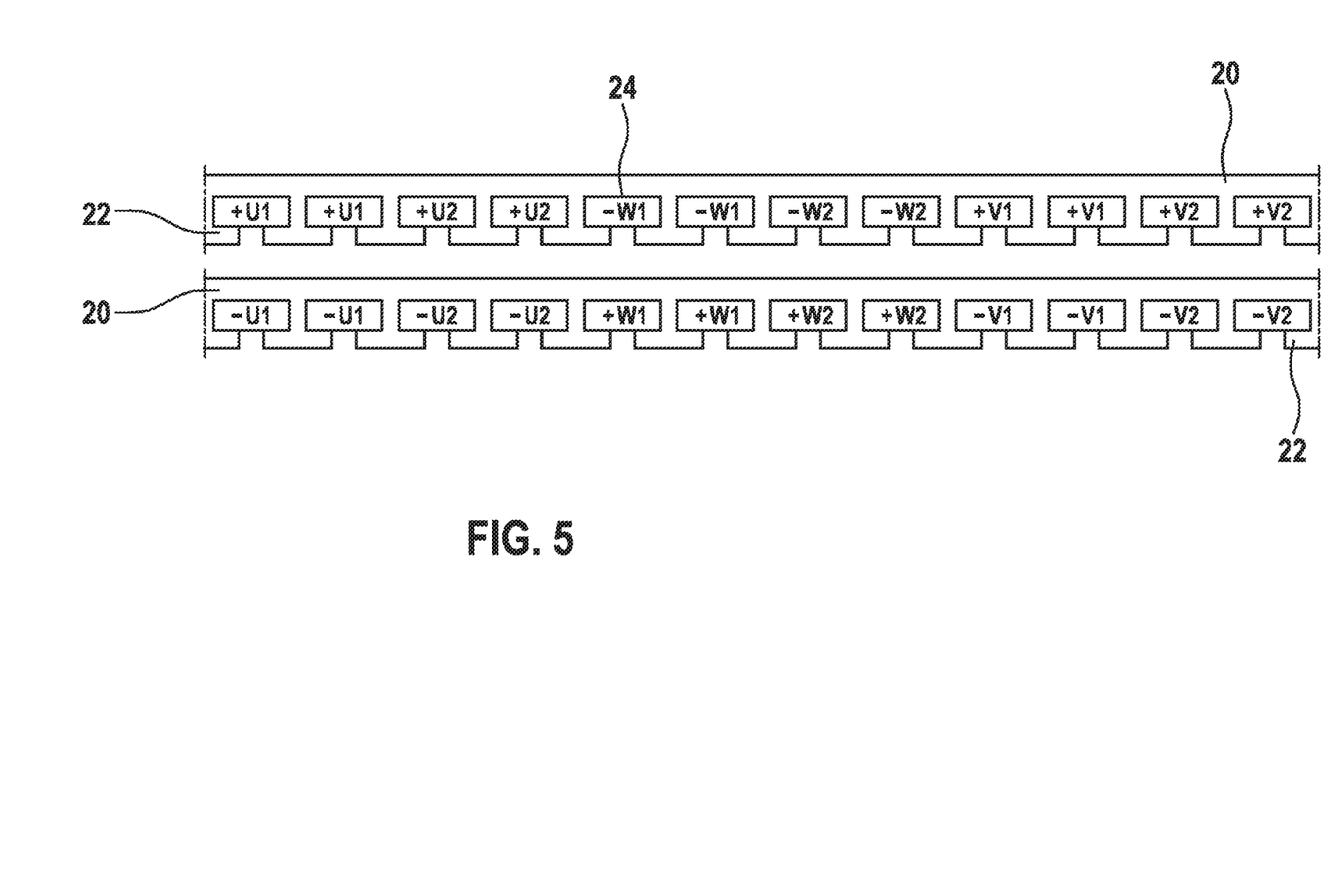
FIG. 5 illustrates a section of a schematic zone plan of the winding strands of the exemplary embodiment of the asynchronous machine in accordance with the invention.

FIG. 5 illustrates a schematic zone plan of the winding strands of the six-phase winding having two three-phase systems and said winding strands form the stator coil elements 24. This zone plan may by way of example also be repeated on numerous occasions. In this exemplary embodiment of the asynchronous machine 1 having a pole pair number p of three and a stator slot total number N1 of seventy two, the zone plan illustrated in FIG. 4 is arranged extending around the stator 20 by way of example three times one behind the other. Consequently, the zone plan of the winding strands that is illustrated in a schematic manner in FIG. 5 in this exemplary embodiment of the asynchronous machine 1 forms an angle of one hundred and twenty degrees of the stator 20. U1, W1, V1 describe the winding strands of a first 3 phase system and U2, W2, V3 describe the winding strands of a second three-phase system. The winding strands are by way of example at least in part arranged in the stator slots 23 between the stator teeth 22 of the stator 20. The algebraic signs + and − describe the direction in which current is flowing through a winding strand, wherein + and − indicate opposing directions. The winding strands U1, W1, V1 are by way of example controlled by a first inverter that is connected to the asynchronous machine 1 and not illustrated in the figures and consequently form the first three-phase system. The winding strands U2, W2, V3 are by way of example controlled by a second inverter that is connected to the asynchronous machine 1 and not illustrated in the figures and consequently form the second three-phase system. By means of correspondingly controlling the respective three inverter phases of the first inverter and of the second inverter, the three basic oscillations of the first three-phase system and the second three basic oscillations of the second three-phase system are operated by way of example in each case as a symmetrical three-phase system with the result that the individual phases of a three-phase system are electrically phase-offset with respect to one another by way of example by one hundred and twenty degrees. The two three-phase systems in this exemplary embodiment are electrically phase-offset with respective to one another by thirty degrees and together form a six-phase system. In this exemplary embodiment, U2 is electrically phase-offset with respect to U1 by thirty degrees, W2 is electrically phase-offset with respect to W1 by thirty degrees and V2 is electrically phase-offset with respect to V1 by thirty degrees. Spatially, in this exemplary embodiment, the respective mutually associated winding strands of the two three-phase systems are arranged spatially offset with respect to one another by ten degrees. Consequently, by way of example one winding strand U1 is spatially offset by ten degrees with respect to a winding strand U2.

In the present application, a stator hole number q1 describes the number of stator slots 23 for each pole and phase of the asynchronous machine 1. The number of the poles corresponds to double the pole pair number p. In this exemplary embodiment of the asynchronous machine 1, the pole pair number p is three and consequently the number of poles is six. A number of phases of six and a stator slot total number N1 of seventy two thus produce a stator hole number q1 of two for this exemplary embodiment of the asynchronous machine 1. In this exemplary embodiment, the quotient of the stator yoke thickness h21 and the stator hole number q1 is between 3.5 millimeters and 4.5 millimeters. Furthermore, the quotient of the stator yoke thickness h21 and the product of the stator hole number q1 and the middle width B22 of the stator tooth 22 in this exemplary embodiment is between 0.8 and 1.2. In the present application, all the dimensions, such as by way of example the stator yoke thickness h21, the middle width B12 of the rotor tooth 12, the middle width B22 of the stator tooth 22 or also the outer diameter D1 of the stator 20 are measured and quoted in millimeters and the variables that are calculated from the dimensions and the ratios that are calculated from the values of the dimensions are calculated in millimeters.

The rotor 10 that is mounted in such a manner as to be able to rotate relative to the stator 20 about the axis 2 is arranged in the interior of the stator 20. In a similar manner to the stator 20, the rotor 10 may also comprise a multiplicity of sheet metal lamellae that are stacked one above the other in the axial direction a. Furthermore, the rotor 10 may comprise electrically conductive rods that are arranged at least in part in the rotor slots 13 and are connected to one another at their ends in an electrically conductive manner by means of two short circuit rings that are not illustrated in the figures. As illustrated in FIG. 1, FIG. 2 and FIG. 3, an inner-lying rotor yoke 11 is provided on the rotor 10. The rotor yoke 11 has by way of example a cylindrical shape and is thus illustrated in an annular shape in the cross-section illustrated in FIG. 1 perpendicular to the axial direction. A multiplicity of radially outward protruding rotor teeth 12 is provided on the rotor yoke 11. The rotor teeth 12 in this exemplary embodiment have an identical length and a rotor slot 13 is provided in this exemplary embodiment between adjacent rotor teeth 12. A rotor tooth 12 has a middle width B12. The middle width B12 describes the width of a rotor tooth 12 perpendicular to the radial direction r at half the height h12 of the rotor tooth 12 (FIG. 4).

The total number of rotor slots 13 that are provided on the rotor 10 is described by a rotor slot total number N2. In this exemplary embodiment, the rotor slot total number N2 is fifty four. The rotor hole number q2 describes in the present application the number of rotor slots 13 for each pole and phase of the asynchronous machine 1. The number of poles corresponds to double the pole pair number p. In this exemplary embodiment of the asynchronous machine 1, the pole pair number p is three and thus the number of poles is six. With a number of phases of six and a rotor slot total number N2 of fifty four, this consequently produces a rotor hole number q2 of 1.5 for this exemplary embodiment of the asynchronous machine 1. In this exemplary embodiment, the quotient of the stator yoke thickness h21 and the rotor hole number q2 is between 4.0 millimeters and 5.0 millimeters.

Furthermore, the quotient of the stator yoke thickness h21 and the product of the rotor hole number q2 and the middle width B12 of the rotor tooth 12 in this exemplary embodiment is between 0.8 and 1.2, in particular between 0.9 and 1.1. In the present application, all the dimensions, such as by way of example the stator yoke thickness h21, the middle width B12 of the rotor tooth 12, the middle width B22 of the stator tooth 22 or also the outer diameter D1 of the stator 20 are measured and quoted in millimeters and the variables that are calculated from the dimensions and the ratios that are calculated from the values of the dimensions are calculated in millimeters.

It goes without saying that further exemplary embodiments and combinations of the illustrated exemplary embodiments are also possible.

The invention claimed is:

1. An asynchronous machine (1) comprising a rotor (10), a stator (20) that surrounds the rotor (10), an outer-lying stator yoke (21) having a stator yoke thickness (h21) on the stator (20), a multiplicity of radially inward protruding stator teeth (22) that are of an identical length on the stator yoke (21), a stator slot (23) in each case between adjacent stator teeth (22), an inner-lying rotor yoke (11) on the rotor (10), a multiplicity of radially outward protruding rotor teeth (12) that are of identical length on the rotor yoke (11), and a rotor slot (13) between adjacent rotor teeth (12), wherein the asynchronous machine is configured as a six-phase model, and wherein a total number (N1) of stator slots (23) on the stator (20) is 72, characterized in that a quotient of the stator yoke thickness (h21) and a stator hole number (q1) is between 3.5 millimeters and 4.5 millimeters, wherein the stator hole number (q1) refers to a number of stator slots (23) for each pole and phase of the asynchronous machine (1).

2. The asynchronous machine as claimed in claim 1, characterized in that the quotient of the stator yoke thickness (h21) and a rotor hole number (q2) is between 4.0 millimeters and 5.0 millimeters, wherein the rotor hole number (q2) refers to a number of rotor slots (13) for each pole and phase of the asynchronous machine (1).

3. The asynchronous machine as claimed in claim 1, characterized in that a quotient of the stator yoke thickness (h21) and a product of a stator hole number (q1) and a middle width (B22) of the stator tooth (22) is between 0.8 and 1.2.

4. The asynchronous machine as claimed in claim 1, characterized in that a quotient of the stator yoke thickness (h21) and a product of a rotor hole number (q2) and a middle width (B22) of the rotor tooth (12) is between 0.8 and 1.2.

5. The asynchronous machine as claimed in claim 1, characterized in that the asynchronous machine (1) comprises two three-phase systems that are phase-offset with respect to one another by thirty degrees.

6. The asynchronous machine as claimed in claim 1, characterized in that a rotor slot total number (N2) is 52 to 58.

7. The asynchronous machine as claimed in claim 6, characterized in that the asynchronous machine (1) comprises of a pole pair number (p) of three.

8. The asynchronous machine as claimed in claim 1, characterized in that an outer diameter (D1) of the stator (20) is between 210 and 230 millimeters.

9. The asynchronous machine as claimed in claim 1, characterized in that a quotient of the stator yoke thickness (h21) and a product of a stator hole number (q1) and a middle width (B22) of the stator tooth (22) is between 0.9 and 1.1.

10. The asynchronous machine as claimed in claim 1, characterized in that a quotient of the stator yoke thickness (h21) and a product of a rotor hole number (q2) and a middle width (B22) of the rotor tooth (12) is between 0.9 and 1.1.

11. The asynchronous machine as claimed in claim 1, characterized in that an outer diameter (D1) of the stator (20) is between 215 and 225 millimeters.

12. An asynchronous machine (1) comprising a rotor (10), a stator (20) that surrounds the rotor (10), an outer-lying stator yoke (21) having a stator yoke thickness (h21) on the stator (20), a multiplicity of radially inward protruding stator teeth (22) that are of an identical length on the stator yoke (21), a stator slot (23) in each case between adjacent stator teeth (22), an inner-lying rotor yoke (11) on the rotor (10), a multiplicity of radially outward protruding rotor teeth (12) that are of identical length on the rotor yoke (11), and a rotor slot (13) between adjacent rotor teeth (12), wherein the asynchronous machine is configured as a six-phase model, and wherein a total number (N1) of stator slots (23) on the stator (20) is 72, characterized in that a quotient of the stator yoke thickness (h21) and a rotor hole number (q2) is between 4.0 millimeters and 5.0 millimeters, wherein the rotor hole number (q2) refers to a number of rotor slots (13) for each pole and phase of the asynchronous machine (1).

13. The asynchronous machine as claimed in claim 12, characterized in that a quotient of the stator yoke thickness (h21) and a product of a stator hole number (q1) and a middle width (B22) of the stator tooth (22) is between 0.8 and 1.2.

14. The asynchronous machine as claimed in claim 12, characterized in that a quotient of the stator yoke thickness (h21) and a product of a rotor hole number (q2) and a middle width (B22) of the rotor tooth (12) is between 0.8 and 1.2.

15. The asynchronous machine as claimed in claim 12, characterized in that the asynchronous machine (1) comprises two three-phase systems that are phase-offset with respect to one another by thirty degrees.

16. The asynchronous machine as claimed in claim 12, characterized in that a rotor slot total number (N2) is 52 to 58.

17. The asynchronous machine as claimed in claim 16, characterized in that the asynchronous machine (1) comprises of a pole pair number (p) of three.

18. The asynchronous machine as claimed in claim 12, characterized in that an outer diameter (D1) of the stator (20) is between 210 and 230 millimeters.

19. The asynchronous machine as claimed in claim 12, characterized in that a quotient of the stator yoke thickness (h21) and a product of a stator hole number (q1) and a middle width (B22) of the stator tooth (22) is between 0.9 and 1.1.

20. The asynchronous machine as claimed in claim 12, characterized in that a quotient of the stator yoke thickness (h21) and a product of a rotor hole number (q2) and a middle width (B22) of the rotor tooth (12) is between 0.9 and 1.1.

* * * * *